US005565284A

United States Patent [19]
Koga et al.

[11] Patent Number: 5,565,284
[45] Date of Patent: Oct. 15, 1996

[54] LITHIUM SECONDARY CELL

[75] Inventors: Keiji Koga, Nagano; Hisashi Suzuki; Masanori Kaya, both of Chiba; Hitoshi Arai, Nagano; Tsuneo Kagotani, Nagano; Yousuke Miyaki, Nagano, all of Japan

[73] Assignee: TDK Corporation, Tokyo, Japan

[21] Appl. No.: 256,862

[22] PCT Filed: Dec. 24, 1993

[86] PCT No.: PCT/JP93/01883

§ 371 Date: Aug. 4, 1994

§ 102(e) Date: Aug. 4, 1994

[87] PCT Pub. No.: WO94/15374

PCT Pub. Date: Jul. 7, 1994

[30] Foreign Application Priority Data

Dec. 25, 1992 [JP] Japan .................... 4-359450

[51] Int. Cl.⁶ ........................................ H01M 4/02
[52] U.S. Cl. .................. 429/218; 429/194; 429/217; 429/232; 429/233; 429/245
[58] Field of Search ............................. 429/194, 217, 429/232, 233, 245

[56] References Cited

U.S. PATENT DOCUMENTS

| | | |
|---|---|---|
| 4,224,390 | 9/1980 | Haering et al. |
| 4,565,751 | 1/1986 | Faust et al. ............... 429/94 |
| 5,399,447 | 3/1995 | Chaloner-Gill et al. ........ 429/191 |
| 5,441,830 | 8/1995 | Moulton et al. .............. 429/212 |
| 5,464,707 | 11/1995 | Moulton et al. .............. 429/212 |

FOREIGN PATENT DOCUMENTS

| | | |
|---|---|---|
| 0396324 | 11/1990 | European Pat. Off. . |
| 0510236 | 10/1992 | European Pat. Off. . |
| 61-77275 | 4/1986 | Japan . |
| 7290075 | 12/1987 | Japan . |
| 62-23433 | 12/1987 | Japan . |
| 63-121260 | 5/1988 | Japan . |
| 2-115234 | 4/1991 | Japan . |
| 3-222258 | 10/1992 | Japan . |
| 3-137010 | 11/1992 | Japan . |

*Primary Examiner*—Maria Nuzzolillo
*Attorney, Agent, or Firm*—Oblon, Spivak, McClelland, Maier & Neustadt, P.C.

[57] ABSTRACT

A main object of the invention is to provide a lithium secondary cell which experiences minimal capacity deterioration upon repetitive charge-discharge cycles.

The lithium secondary cell of the invention is characterized in that a negative and/or positive electrode material is bonded to a current collector surface by a binder containing a crosslinked polymer or formed by coating to a current collector a composition comprising an active material and a polymer binder containing a fluorinated polymer which is curable upon exposure to radiation, followed by radiation curing treatment.

13 Claims, 1 Drawing Sheet

LITHIUM SECONDARY CELL

TECHNICAL FIELD

This invention relates to a lithium secondary cell.

BACKGROUND OF THE INVENTION

Secondary batteries are often used as power supplies for driving portable electronic appliances or the like for the purpose of economy and resource saving and their use is remarkably expanding in these years. In accordance with size reduction and performance up-grade of electronic appliances, the batteries loaded therein are required to have a small size, light weight, and high capacity. On the other hand, conventional commonly used secondary batteries are lead-acid batteries and nickel-cadmium batteries. Recently non-aqueous lithium secondary batteries featuring a high energy density have been proposed and used in practice.

Lithium secondary batteries using non-aqueous electrolytes, however, have the problem that they have a low current density as compared with conventional secondary batteries using aqueous solution because the electrolyte using a non-aqueous solvent as an ion-conducting medium has a lower ion-conducting rate.

Proposals were made to overcome such problems, for example, by increasing the surface area of electrodes to increase their contact area with the electrolyte. More particularly, an electrode coating composition containing an active material and a polymer binder is applied to a current collector in the form of a thin metal foil to form a thin electrode layer thereon and a plurality of such coated foils are placed one on another or spirally wound with a separator interleaved therebetween. For example, JP-A 63-121260 describes a lithium secondary cell using a non-aqueous liquid electrolyte, $LiCoO_2$ and/or $LiNiO_2$ as a positive electrode, and carbon as a negative electrode. Each such electrode is an electrode layer of a microparticulate electrode active material bonded in a polymer-base binder.

However, some problems arise when an electrode layer is formed on a current collector typically in the form of a metal foil. Numerous repetition of charge-discharge cycles exacerbates the interfacial adhesion between the current collector and the electrode layer and lowers the discharge capacity of the electrodes, resulting in an insufficient cycle life. Fine particles of the electrode layer shed from the current collector can cause short-circuits.

One of the probable causes is that as the active material is expanded and contracted by doping and dedoping of lithium ions upon charging and discharging, defects occur at the electrode layer-current collector interface, active material-conductive material interface, active material-binder resin interface, etc. Also there arise problems that decomposition of polymer used as the binder by oxidation and reduction upon charging and discharging or swelling or dissolution of the polymer in non-aqueous electrolyte solution exacerbates the interfacial adhesion between the current collector and the electrode layer, and failure of conductor network by swelling of the polymer lowers the conductivity of the electrode layer.

The above-mentioned and other causes give rise to the problem of a short battery life in that repetition of charge-discharge cycles reduces the battery capacity.

DISCLOSURE OF THE INVENTION

A primary object of the present invention is to provide a lithium secondary cell which prevents the positive and negative electrode materials from shedding during assembly process and experiences minimized capacity lowering upon repetition of charge-discharge operation.

Another object of the present invention is to provide a lithium secondary cell which experiences minimized capacity lowering upon repetition of charge-discharge operation in increased current density and capacity conditions and thus has a long life and high reliability.

These and other objects are achieved by the present invention which is defined below as (1) to (13).

(1) A lithium secondary cell using carbon as a negative electrode material and a layer lattice compound which allows for intercalation or doping of lithium ions or carbon as a positive electrode material, characterized in that said negative electrode material and/or positive electrode material is bonded to a surface of a current collector by a binder containing a crosslinked polymer.

(2) The lithium secondary cell of (1) wherein said crosslinked polymer is obtained by dissolving a crosslinkable polymer in an organic solvent, dispersing the electrode material in powder form in the solution to form a composition, and applying the composition to the current collector, followed by drying and crosslinking.

(3) The lithium secondary cell of (1) or (2) wherein said crosslinked polymer contains fluorine and is crosslinked with a polyamine, polyol, peroxide or triazine dithiol.

(4) The lithium secondary cell of (1) or (2) wherein said crosslinked polymer is a silane-grafted polyvinylidene fluoride crosslinked with water.

(5) The lithium secondary cell of any one of (1) to (4) wherein said carbon is graphite having a mean particle size of 1 to 30 μm.

(6) The lithium secondary cell of any one of (1) to (5) wherein a solvent mixture containing ethylene carbonate as a major component is used as a solvent for an electrolyte.

(7) A lithium secondary cell comprising a non-aqueous electrolyte including a lithium-containing electrolyte, characterized in that an electrode layer forming a negative electrode and/or positive electrode is formed by coating to a current collector a composition comprising an active material and a polymer binder containing a fluorinated polymer which is curable upon exposure to radiation, followed by radiation curing treatment.

(8) The lithium secondary cell of (7) wherein said polymer binder contains at least 50% by weight of the fluorinated polymer based on the total weight of polymers in the binder.

(9) The lithium secondary cell of (7) or (8) wherein said fluorinated polymer has a radiation-curable group introduced at a molecular end or a molecular side chain for promoting its radiation curability.

(10) The lithium secondary cell of any one of (7) to (9) wherein said composition from which said electrode layer is formed contains a radiation-curable compound having at least two groups each having a radiation-curable unsaturated double bond.

(11) The lithium secondary cell of (10) characterized in that said group having an unsaturated double bond is an allyl group of the following formula (1):

wherein R is hydrogen or fluorine.

(12) The lithium secondary cell of (10) wherein said group having an unsaturated double bond is an acryloyl group of the following formula (2):

wherein R is hydrogen, fluorine, an alkyl group or a fluoroalkyl group.

(13) The lithium secondary cell of any one of (9) to (12) wherein said radiation-curable compound is present in an amount of 0.1 to 50 parts by weight per 100 parts by weight of the total weight of polymers.

OPERATION AND ADVANTAGE OF THE INVENTION

The present invention uses a binder containing a crosslinking polymer as defined above for securing to a current collector surface a coating of carbon powder or layer lattice compound powder used as an active material for positive and negative electrodes of a lithium secondary cell. Then the coating of active material powder is improved in adhesion and detachment of the active material is prevented during cell assembly, ensuring that the lithium secondary cell has a high capacity. Also the crosslinking polymer is not soluble in the non-aqueous solvent used in the liquid electrolyte. In a lithium secondary cell using carbon as the active material, the cell capacity is significantly improved by using a solvent mixture of ethylene carbonate and diethyl carbonate as the solvent for the electrolyte. Conventional binders used in lithium secondary cells are soluble in this solvent mixture, which allows the active material to shed from the current collector surface upon repetition of charge-discharge operation, resulting in a short charge-discharge cycle life. In contrast, the crosslinking polymer used in the present invention is not soluble in the solvent mixture, ensuring a lithium secondary cell with a satisfactory charge-discharge cycle life.

Japanese Patent Application Kokai (JP-A) No. 3-222258 discloses an invention relating to an improvement in a lithium secondary cell. The lithium secondary cell of the previous invention is a lithium-iron sulfide cell using iron sulfide as the positive electrode active material and a lithium plate as the negative electrode active material. In the previous invention, iron sulfide powder is coated to a current collector associated with the positive electrode using a dispersion in water of a fluoroelastomer in the form of a hexafluoropropylene-vinylidene fluoride copolymer as a binder, thereby preventing separation of the iron sulfide from the current collector.

Although the fluoroelastomer used in the previous invention is one of the binders used in the present invention, the lithium-iron sulfide cell performs on a completely different principle from that of the lithium secondary cell of the present invention and uses positive and negative electrode materials which are both different from those of the present invention. The lithium secondary cell of the present invention selects the crosslinking polymer defined herein as a binder especially suitable for affixing the carbon powder or layer lattice compound powder which is otherwise very difficult to bond to the current collector. The above-referred patent publication does not refer to the charge-discharge cycle life or describe the use of a solvent mixture of ethylene carbonate and diethyl carbonate.

In fact, the inventors prepared an electrode substantially in accordance with the teaching of JP-A 3-222258 except for the use of graphite as the active material and found that the electrode material was very low in adhesive force and readily separated off.

In the other embodiment of the invention wherein a binder containing a fluorinated polymer which is curable upon exposure to electron beams is used and radiation curing treatment is effected, a thin homogeneous electrode layer can be formed and degradation of the binder with charge-discharge cycles can be prevented.

Further inclusion of a compound having at least two radiation-curable functional groups significantly improves the adhesion of the binder to the current collector and the chemical stability of the binder during charge-discharge operation.

Then the secondary cell of the present invention has an improved discharge capacity, minimized capacity lowering upon repetition of charge-discharge operation, and a significantly extended charge-discharge cycle life.

Therefore, the secondary cell of the present invention is a lithium secondary cell which can be increased in current density while maintaining a high capacity, a long cell life upon repetition of charge-discharge operation, and improved reliability.

Understandably, the embodiment of the invention wherein a binder containing a fluorinated polymer which is curable upon exposure to electron beams is used and radiation curing treatment is effected allows a choice of the active materials for positive and negative electrodes from a very wide range of materials while maintaining satisfactory cell performance.

ILLUSTRATIVE CONSTRUCTION

Figure 1:
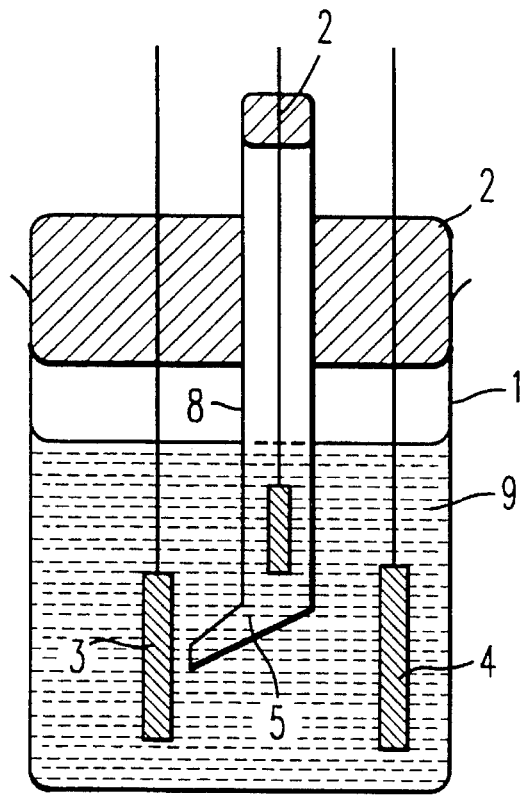
FIG. 1 is a cross-sectional view of a cell constructed for the measurement of charge-discharge performance.

The illustrative construction of the invention is described in detail.

The lithium secondary cell of the present invention is generally classified into the first embodiment of lithium secondary cell using carbon as a negative electrode material and a layer lattice compound which allows for intercalation or doping of lithium ions or carbon as a positive electrode material wherein the negative electrode material and/or positive electrode material is joined to a current collector surface by a binder containing a crosslinked polymer and the second embodiment of lithium secondary cell wherein an electrode layer forming a negative electrode and/or positive electrode is formed by coating to a current collector a composition comprising an active material and a polymer binder containing a fluorinated polymer which is curable upon exposure to radiation, followed by radiation curing treatment. Then the construction of lithium secondary cell is described below for each of the first and second embodiments.

Lithium secondary cell of the first embodiment

The lithium secondary cell of the invention uses carbon as an active material in a negative electrode material and a layer lattice compound which allows for intercalation or doping of lithium ions or carbon as an active material in a positive electrode material.

The carbon used as the active material may be suitably selected from, for example, natural or artificial graphite, resin fired carbon materials, carbon black, meso-phase carbon black, resin fired carbon materials, gas phase grown carbon fibers, carbon fibers, and the like, such as those described in JP-B 62-23433 and JP-A 3-137010, for example. These are used in powder form. Inter alia, graphite is preferred, typically having a mean particle size of 1 to 30 μm, especially 5 to 25 μm. A too small mean particle size has a likelihood of reducing the charge-discharge cycle life and increasing the variation of capacity (individual difference). A too large mean particle size would noticeably increase the variation of capacity, resulting in a lower average capacity. A large mean particle size results in an increased variation of capacity probably because the contact between graphite and the current collector and the contact between graphite particles are diversified.

The layer lattice compound in which lithium ions can intercalate or which can be doped with lithium ions is preferably selected from composite oxides containing lithium, for example, $LiCoO_2$, $LiMnO_2$, and $LiNiO_2$. The layer lattice compound powder preferably has a mean particle size of about 1 to 40 μm.

It is to be noted that where carbon is used as the positive electrode material, electrolyte anions (for example, $ClO_4-$, $BF_4-$, and $PF_6-$) move into and out of the positive electrode in accordance with charging and discharging and that where the layer lattice compound is used as the positive electrode material, lithium ions move into and out of the positive electrode in accordance with charging and discharging.

According to the invention, the negative electrode material and/or positive electrode material, preferably each is bonded to a surface of a current collector by a binder containing a crosslinked polymer.

The crosslinked polymers are preferably polymers containing fluorine. They are preferably crosslinked using crosslinking agents, for example, polyamines such as hexamethylenediamine carbamate, N,N'-dicinnamylidene-1,6-hexanediamine, and 4,4'-methylene-bis(cyclohexylamine) carbamate, polyols such as bisphenol-AF or 2,2-bis(4-hydroxyphenyl)hexafluoropropane and bisphenol-A or 2,2-bis(4-hydroxyphenyl)propane, and peroxides such as 2,5-dimethyl-2,5-di-t-butylperoxyhexane and 1,3-bis(t-butylperoxyisopropyl)benzene, and crosslinking aids for peroxides, for example, triallyl isocyanurate, and triazine dithiols such as 6-dibutylamyl-1,3,5-triazine-2,4-dithiol. Preferably at least one of fluoroelastomers, for example, such as vinylidene fluoride-propylene hexafluoride copolymers, vinylidene fluoride-propylene hexafluoride-ethylene tetrafluoride copolymers, ethylene tetrafluoride-propylene copolymers, ethylene tetrafluoride-propylene-vinylidene fluoride copolymers, and perfluorinated fluoroelastomers is crosslinked with any of the above-mentioned crosslinking agents. The amount of the crosslinking agent added is generally about 0.5 to about 10 parts, preferably about 1 to about 5 parts by weight per 100 parts by weight of a compound to be crosslinked.

Especially preferred among the above-mentioned crosslinking agents are the polyols because they remarkably improve the charge-discharge cycle performance of the cell.

It is also acceptable to crosslink with water polyvinylidene fluoride having a silane compound grafted thereto. The silane-grafted polyvinylidene fluoride is described, for example, in JP-A 2-115234.

Especially preferred among the above-mentioned crosslinked polymers are rubbery crosslinked polymers. The use of rubbery crosslinked polymers is effective for reducing internal resistance and improving heavy duty performance in particular. The lowering of internal resistance is attributable to the shape anisotropy and orientation of active material particles. The carbon, especially graphite used as the active material is of flattened particles having a layer structure. Such flattened particles have the tendency that the particles are coated to a current collector surface by an applicator or the like, with their layer plane oriented in the surface of the current collector. This orientation is facilitated by using polyvinylidene fluoride as a binder because it has a lamellar structure. Since the lithium secondary cell discharges electricity by releasing lithium ions from between carbon layers, the layer plane of carbon particles oriented substantially parallel to the current collector surface inhibits diffusion of lithium ions from between the carbon layers into the liquid electrolyte, increasing internal resistance. On the other hand, since the rubbery binder continues to assume a random structure after coating, the carbon particles remain in generally non-oriented state after coating, restraining internal resistance increase.

According to the invention, the rubbery or other crosslinked polymer is preferably obtained by dissolving a crosslinkable polymer in an organic solvent, dispersing the electrode material in the solution to form a composition, and applying the composition to the current collector, followed by drying and crosslinking. Examples of the solvent in which the polymers are soluble as described above include N-methylpyrrolidone, acetone, methyl ethyl ketone, methyl isobutyl ketone, and tetrahydrofuran. With respect to the adhesion of electrode material to the current collector, the use of such a solution of a crosslinkable polymer in a solvent is superior to the use of a dispersion of a crosslinkable polymer in water.

The crosslinked polymers may be used in admixture of two or more. In addition to the above-mentioned crosslinked polymer, the binder may contain another polymer such as polymethyl methacrylate (PMMA) and polycarbonate (PC), preferably in an amount of less than about 25% by volume of the entire binder.

The amount of the binder raw material added is preferably about 3 to about 13 parts by weight per 100 parts by weight of the electrode material. Smaller amounts of the binder raw material would provide less adhesion whereas larger amounts of the binder raw material would result in an insufficient cell capacity.

The electrolyte liquid is prepared by dissolving a lithium-containing electrolyte in a non-aqueous solvent. The lithium-containing electrolyte may be suitably selected from, for example, $LiClO_4$, $LiBF_4$, $LiPF_6$, etc. The non-aqueous solvent may be suitably selected from, for example, ethers, ketones, and carbonates as well as the organic solvents exemplified in JP-A 63-121260, with the carbonates being especially preferred in the practice of the invention. Preferred among the carbonates are solvent mixtures of ethylene carbonate as a major component and at least one other solvent. The mixing ratio of ethylene carbonate to other solvent is preferably from 30:70 to 70:30 in volume ratio. The reason is that ethylene carbonate is solidified at room temperature because of its high solidifying point of 36.4° C. and cannot be used singly as a cell electrolyte liquid. Therefore at least one other solvent having a lower solidifying point is added thereto to lower the solidifying point. The other solvent is any desired one as long as it can lower the solidifying point of ethylene carbonate. Examples include diethyl carbonate, dimethyl carbonate, propylene carbonate, 1,2-dimethoxyethane, methyl ethyl carbonate, γ-butyrolactone, γ-valerolactone, γ-octanoic lactone, 1,2-diethoxyethane, 1,2-ethoxymethoxyethane, 1,2-dibutoxyethane, 1,3-dioxolan, tetrahydrofuran, 2-methyltetrahydrofuran, 4,4-dimethyl-1,3-dioxane, and butylene carbonate. The cell capacity is significantly improved by using carbon as the active material and the above-mentioned solvent mixture. Unless a crosslinked polymer is used as the binder for the active material, the binder would be dissolved in the solvent mixture, allowing a drastic drop of the cell capacity upon repetition of charge-discharge operation. The charge-discharge cycle life is significantly improved by using the above-mentioned crosslinked polymer base binder.

Lithium secondary cell of the second embodiment

It is desired in the lithium secondary cell of the second embodiment that a polymer binder contain a fluorinated polymer which is curable upon exposure to radiation and radiation curing treatment be performed. The second embodiment eliminates the need to limit the negative electrode active material and other materials as in the lithium secondary cell of the first embodiment, permits a choice of such materials from a wide range, and gives freedom of cell design. The cell exhibits improved charge-discharge cycle performance over the use of the above-mentioned crosslinking agents.

The fluorinated polymer contained in the binder of which the electrode layer is formed may be any of polymers containing a fluorine atom or atoms in a molecule, for example, resins such as polytetrafluoroethylene, modified polytetrafluoroethylene, polyhexafluoropropylene, tetrafluoroethylene-hexafluoropropylene copolymers, tetrafluoroethylene-perfluoroalkyl vinyl ether copolymers, polytrifluoroethylene, ethylene-tetrafluoroethylene copolymers, fluoroethylene-hydrocarbon vinyl ether copolymers, polychlorotrifluoroethylene, ethylene-chlorotrifluoroethylene copolymers, polyvinyl fluoride, polyvinylidene fluoride, vinylidene fluoride-hexafluoropropylene copolymers, fluorinated (meth)acrylate resins, 2-fluoroacrylate resins, fluorinated epoxy resins, fluorinated epoxy (meth)acrylate resins, fluorinated polyether resins, fluorinated polyimide resins, fluorinated polyester resins, fluorinated polyamide resins, fluorinated polycarbonate resins, fluorinated polyformal resins, fluorinated polyketone resins, fluorinated polyazomethine resins, fluorinated polyazole resins, and fluorinated polyallyloxysilane resins; and elastomers such as vinylidene fluoride-hexafluoropropylene fluoroelastomer, vinylidene fluoride-tetrafluoroethylene fluoroelastomer, tetrafluoroethylene-perfluoroalkyl vinyl ether fluoroelastomer, vinylidene fluoride-tetrafluoroethylenehexafluoropropylene fluoroelastomer, vinylidene fluoride-tetrafluoroethylene-perfluoroalkyl vinyl ether fluoroelastomer, tetrafluoroethylene-perfluoroalkyl vinyl ether fluoroelastomer, propylene-tetrafluoroethylene fluoroelastomer, fluorosilicone rubber, fluorinated phosphazene rubber, fluorinated thermoplastic rubbers, and flexible fluorocarbon resins; alone and mixtures thereof, although the invention is not limited thereto.

While the fluorinated polymers mentioned above have radiation curing ability by themselves, they may be modified for enhancing their radiation curing ability by introducing a radiation curable group at a molecular end or a molecular side chain. The radiation curable groups to be introduced into the fluorinated polymers are preferably groups containing about 2 to 10,000 unsaturated double bonds such as allyl and acryloyl per molecule.

The fluorinated polymers mentioned above are not limited in molecular weight although they preferably have a weight average molecular weight Mw of about 5,000 to about 100,000,000. With a molecular weight of less than 5,000, the electrode layer would become too low in strength to prevent interfacial separation from the current collector due to expansion and contraction of the electrode layer during charge-discharge cycles and shedding of the active material from the electrode layer. A molecular weight of more than 100,000,000 would make it difficult to coat the electrode layer as a thin layer.

In addition to the above-mentioned fluorinated polymers, the electrode composition may contain another polymer as the binder, for example, polymers such as polyolefins, polymethyl methacrylate, polycarbonate, and epoxy resins, and polymers modified by introducing a radiation curable group at a molecular end or a molecular side chain. The content of the fluorinated polymer is not particularly limited, but is preferably at least 50% by weight of the total weight of polymers used as the binder. Less than 50% by weight of the fluorinated polymer would result in insufficient chemical stability during charge-discharge operation and exacerbate the charge-discharge capacity and cycle life of the cell.

Also preferably the amount of entire polymers per 100 parts by weight of the active material is about 3 to about 30 parts by weight. Less than 3 parts by weight of polymers would provide a cell with a low charge-discharge capacity because the electrode layer having low mechanical strength cannot prevent its interfacial separation from the current collector and shedding of the active material in repetitive charge-discharge operation. More than 30 parts by weight of polymers would provide a cell with a low capacity and low current density because the electrode layer would be exacerbated in conductivity and reduced in contact area with the electrolyte solution due to reduced voids therein.

The above-mentioned binder is generally used by dissolving or dispersing the binder material in powder form in a solvent although it may sometimes be used in powder form without using solvent. The solvent used herein is not critical and may be selected for a particular purpose from various solvents including water, methyl ethyl ketone, cyclohexanone, isophoron, N-methylpyrrolidone, N,N-dimethylformamide, N,N-dimethylacetamide, and toluene.

The electrode composition preferably contains a radiation-curable compound having at least two groups, especially 2 to 12 groups, each having a radiation-curable unsaturated double bond because excellent charge-discharge cycle performance is expected. Preferably the group having a radiation-curable unsaturated double bond is an allyl group of formula (3) or an acryloyl group of formula (4) shown below.

R is hydrogen or fluorine.

R is hydrogen, fluorine, an alkyl group, preferably a methyl group, or a fluoroalkyl group, preferably a trifluoromethyl group.

Preferred, non-limiting examples of the radiation-curable compound used herein include allyl group-containing compounds such as diallyl sebacate, diallyl phthalate, triallyl trimellitate, triallyl trimesate, triallyl cyanurate, and triallyl isocyanurate;

acrylates such as ethylene glycol diacrylate, diethylene glycol diacrylate, triethylene glycol diacrylate, polyethylene glycol diacrylate, tripropylene glycol diacrylate, 1,3-butylene glycol diacrylate, 1,4-butane diol diacrylate, 1,5-pentane diol diacrylate, neopentyl glycol diacrylate, hydroxypivalic acid neopentyl glycol ester diacrylate, 1,6-hexanediol acrylate, tripropylene glycol diacrylate, trimethylol propane triacrylate, trimethylol propane-alkylene oxide adduct triacrylate, glycerin-alkylene oxide adduct triacrylate, pentaerythritol triacrylate, pentaerythritol tetraacrylate, dipentaerythritol pentaacrylate, dipentaerythritol hexaacrylate, bisphenol-A-alkylene oxide adduct diacrylate, trisacryloxyethyl phosphate, bisacryloyloxyethyl-hydroxyethyl isocyanurate, trisacryloyloxyethyl isocyanurate, oligo-ester acrylate, epoxyacrylate, and urethane acrylate;

methacrylates such as ethylene glycol dimethacrylate, diethylene glycol dimethacryate, triethylene glycol dimethacrylate, polyethylene glycol dimethacrylate, tripropylene glycol dimethacrylate, 1,3-butylene glycol dimethacrylate, 1,4-butanediol dimethacrylate, 1,5-pentanediol dimethacrylate, neopentyl glycol dimethacrylate, hydroxypivalic acid neopentyl glycol ester dimethacrylate, 1,6-hexanediol methacrylate, tripropylene glycol dimethacrylate, trimethylolpropane trimethacrylate, trimethylol propanealkylene oxide adduct trimethacrylate, glycerin-alkylene oxide adduct trimethacrylate, pentaerythritol trimethacrylate, pentaerythritol tetramethacrylate, dipentaerythritol pentamethacrylate, dipentaerythritol hexamethacrylate, bisphenol-A-alkylene oxide adduct dimethacrylate, trismethacryloxyethyl phosphate, bismethacryloyloxyethyl hydroxyethyl isocyanurate, trismethacryloyloxyethyl isocyanurate, oligo-ester methacrylate, epoxy methacrylate, and urethane methacrylate; and fluoroacrylates such as ethylene glycol di-2-fluoroacrylate, diethylene glycol di-2-fluoroacrylate, triethylene glycol di-2-fluoroacrylate, polyethylene glycol di-2-fluoroacrylate, tripropylene glycol di-2-fluoroacrylate, 1,3-butylene glycol di-2-fluoroacrylate, 1,4-butadienediol di-2-fluoroacrylate, 1,5-pentanediol di-2-fluoroacrylate, neopentyl glycol di-2-fluoroacrylate, hydroxypyvalic acid neopentyl glycol ester di-2-fluoroacrylate, 1,6-hexanediol 2-fluoroacrylate, tripropylene glycol di-2-fluoroacrylate, trimethylolpropane tri-2-fluoroacrylate, trimethylolpropanealkylene oxide adduct tri-2-fluoroacrylate, glycerin-alkylene oxide adduct tri-2-fluoroacrylate, pentaerythritol tri-2-fluoroacrylate, pentaerythritol tetra-2-fluoroacrylate, dipentaerythritol penta-2-fluoroacrylate, dipentaerythritol hexa-2-fluoroacrylate, bisphenol-A-alkylene oxide adduct di-2-fluoroacrylate, tris-2-fluoroacryloxyethyl phosphate, bis-2-fluoroacryloyloxyethyl hydroxyethyl isocyanurate, tris-2-fluoroacryloyloxethyl isocyanurate, oligo-ester-2-fluoroacrylate, epoxy-2-fluoroacrylate, and urethane-2-fluoroacrylate, alone and in admixture.

The radiation-curable compound is preferably present in an amount of 0.1 to 50 parts, especially 1 to 20 parts by weight per 100 parts by weight of the total weight of polymers. Less than 0.1 part by weight of radiation-curable compound would provide a low crosslinking density and unsatisfactory improvements in discharge capacity and charge-discharge cycle life. With more than 50 parts by weight of radiation-curable compound, the electrode layer would be rather reduced in mechanical strength and improvement in charge-discharge cycle life be unsatisfactory.

After formation as a film, the electrode layer is subject to radiation curing treatment. The curing treatment may be done in accordance with various well-known procedures.

Where ultraviolet radiation is used in the curing treatment, a photo-polymerization sensitizer is preferably added to the above-mentioned fluorocarbon resins and radiation curable compounds.

The photo-polymerization sensitizer may be selected from conventional well-known ones, for example, benzoins such as benzoin methyl ether, benzoin ethyl ether, and α-methylbenzoin, ketones such as benzophenone, acetophenone, and bisdialkylaminobenzophenone, quinones such as anthraquinone and phenanthraquinone, and sulfides such as benzidyl sulfide and tetramethylthiuram monosulfide. The content of photopolymerization sensitizer is preferably 0.01 to 10 parts by weight per 100 parts by weight of the fluorocarbon resin. For ultraviolet irradiation, UV lamps such as xenon discharge lamps and deuterium discharge lamps may be used.

Where electron beams are used in the curing treatment, it is convenient to use a radiation accelerator having an accelerating voltage of 100 to 750 kV, preferably 150 to 300 kV and to provide radiation at an absorption dose of 1 to 100 megarad. The atmosphere for electron beam exposure is preferably an inert gas atmosphere, especially a nitrogen atmosphere.

To the above-mentioned mixture of the fluorocarbon resin and radiation curable compound, any additive such as acid acceptor may be added. The acid acceptor may be any of conventional well-known ones, for example, magnesium oxide and calcium hydroxide. The content of acid acceptor is preferably about 1 to about 15 parts by weight per 100 parts by weight of the fluorocarbon resin.

In the lithium secondary cell of the invention, the negative electrode active material may be any of carbonaceous materials and conductive polymers which allow for intercalation or doping of lithium ions, or metallic lithium and lithium alloys. The carbonaceous material may be suitably selected from graphite, carbon black, meso-phase carbon black, resin-fired carbon materials, gas phase grown carbon fibers, and carbon fibers, with those described in JP-B 62-23433 and JP-A 3-137010, for example, being useful.

The conductive polymer may be selected from polyacetylene, polyphenylene, and polyacene, with those described in JP-A 61-77275 being useful.

The positive electrode active material which is not critical includes metal compounds, metal oxides, metal sulfides, carbon materials or conductive polymers which allow for intercalation or doping of lithium ions, for example, such as $LiCoO_2$, $LiNiO_2$, $LiMnO_2$, $Li_2Mn_2O_4$, $V_2O_5$, $TiS_2$, $MoS_2$, $FeS_2$, polyacetylene, polyaniline, polypyrrole, polythiophene, and polyacene, as well as those described in JP-B 61-53828 and 63-59507.

Where metal oxides and metal sulfides are used as the positive electrode active material, it is preferred to add carbon materials including carbon black such as acetylene black and Ketjen black and graphite as a conductive agent.

The electrolyte used in the secondary cell of the invention is preferably a non-aqueous electrolyte including a lithium-containing electrolyte. The lithium-containing electrolyte which is not critical may be suitably selected from $LiPF_6$, $LiBF_4$, $LiClO_4$, $LiAsF_6$, and $LiCF_3SO_3$, for example. The medium used for holding the electrolyte includes non-aqueous solvents such as organic solvents, polymers and ceramic materials.

The non-aqueous solvent which is not critical may be selected from, for example, dimethyl sulfoxide, sulfolane, ethylene carbonate, propylene carbonate, γ-butyrolactone, γ-valerolactone, γ-octanoic lactone, 1,2-diethoxyethane, 1,2-dimethoxyethane, 1,2-dibutoxyethane, 1,3-dioxolan, tetrahydrofuran, 2-methyltetrahydrofuran, alone and mixtures thereof.

The amount of the electrolyte dissolved in non-aqueous medium is preferably about 0.1 to 2 mol/liter though not critical.

Fabrication of electrode

The electrode for the secondary cell of the invention may be prepared in accordance with a conventional process, for example, by mixing and dispersing the active material, binder polymer(s), crosslinking agent, radiation curable compound and various additives optionally with a solvent in a dispersion device such as an agitator, ball mill, super-sand mill, pressure kneader or the like, to thereby form an electrode coating composition. The concentration and viscosity of this coating composition my be suitably determined depending on a particular application means.

The electrode coating composition is coated to a web-shaped current collector. The coating method which is not critical may be selected from well-known methods including electrostatic coating, dip coating, spray coating, roll coating, doctor blade coating, gravure coating, and screen printing methods. The coating is then subject to rolling treatment by means of a plate press or calender roll, if necessary.

The material and shape of the current collector are not particularly limited. Any of metals and alloys such as aluminum, copper, nickel, titanium and stainless steel may be used in web shape, for example, foil, perforated foil and mesh shape.

After the coating composition is coated to the current collector and optionally dried, the polymer(s) in the coating is crosslinked by heat treatment or immersion in water or the polymer(s) in the coating is cured by radiation exposure. At the end of crosslinking or curing, the coating preferably has a thickness of about 10 to about 500 μm.

The structure of the lithium secondary cell of the invention, which is not particularly limited, generally includes a positive electrode, a negative electrode and optionally a separator and may take the form of a paper, button, laminate or roll type battery.

EXAMPLE

Examples of the invention are given below by way of illustration.

Example 1

<Example 1-1>

The binder raw material solution used was fluorocarbon resin Daiel DPA-351 manufactured by Daikin Industry K. K. It is a solution of a vinylidene fluoride-propylene hexafluoride-ethylene tetrafluoride copolymer in solvent which is crosslinkable with polyamine. A polyethylene bottle having a volume of 250 cm$^3$ was charged with 4 grams of Daiel DPA-351 (of which 1 gram was the binder raw material), 47.0 grams of N-methylpyrrolidone as a diluent, 0.2 grams of a crosslinking agent (polyamine) solution, 16.3 grams of synthetic graphite KS15 (mean particle size 15 μm) manufactured by Ronza Company as a negative electrode active material, and 125 cm$^3$ of ZrO$_2$ beads of diameter 1 mm as a dispersing medium. The weight ratio of binder raw material to graphite was 6:94. Dispersion was continued for 10 hours to form an electrode coating composition. The electrode coating composition was coated to a titanium plate of 20 mm square in an amount of about 130 mg. The electrode coating composition was also coated to a copper foil of 15 μm thick, 45 mm wide and 150 mm long by means of an applicator. The coatings were dried in vacuum at 120° C. for 2 hours to accomplish solvent removal and crosslinking. A titanium wire was spot welded to the titanium plate to form an electrode.

Using the electrode as a working electrode, a charge-discharge test was carried out as follows. The counter electrode and reference electrode were lithium plates connected to titanium wires and the electrolyte solution used was a solvent mixture of ethylene carbonate and diethyl carbonate in a volume ratio of 1:1 in which 1M of lithium perchlorate was dissolved. Charge-discharge operation was effected at a constant current flow of 2 mA over the range of from 0 to 1 volt versus Li/Li$^+$. FIG. 1 is a cross-sectional view of a cell constructed for the measurement of charge-discharge performance. Illustrated are a glass beaker 1 of 100 cm$^3$, silicone plugs 2, a working electrode 3, a counter electrode 4, a reference electrode 5, a Lugin tube 8, and an electrolyte solution 9.

The coating on the copper foil was subject to an adhesion test known as a cross-hatch adhesion test. More particularly, using a multi-cross-cutter model 295 manufactured by Erichsen A. G. in Germany, eleven cut lines were scribed in the coating in each of longitudinal and transverse directions to define 100 sections, from which the percentage of peeled coating sections was determined.

In the charge-discharge test, the discharge capacity at the second cycle was as large as 336 mAh per gram of graphite and the percent capacity deterioration defined by the following formula was as low as 1.5%, indicating satisfactory cell performance.

percent capacity deterioration={(2nd cycle discharge capacity)−(10th cycle discharge capacity)}/(2nd cycle discharge capacity)×100%

The result of the adhesion test was also satisfactory because the number of peeled sections was zero.

<Comparative Example 1-1>

Fluorocarbon resin Daiel DPA-351 manufactured by Daikin Industry K. K. was used as a binder solution as in Example 1, but without adding the crosslinking agent. A polyethylene bottle having a volume of 250 cm$^3$ was charged with 4 grams of Daiel DPA-351 (of which 1 gram was the binder), 47.0 grams of N-methylpyrrolidone as a diluent, 16.3 grams of synthetic graphite KS15 manufactured by Ronza Company as a negative electrode active material, and 125 cm$^3$ of ZrO$_2$ beads of diameter 1 mm as a dispersing medium. Dispersion was continued for 10 hours to form an electrode coating composition. As in Example 1, the electrode coating composition was coated to a titanium plate and a copper foil and evaluated for charge-discharge performance and adhesion.

As a result, the discharge capacity at the second cycle was as small as 140 mAh per gram of graphite and the percent capacity deterioration was as high as 39%. In the adhesion test, 50 sections among 100 coating sections peeled off, indicating low bond strength.

<Comparative Example 1-2>

Fluoroelastomer dispersed in water, Daiel Latex GL-252 manufactured by Daikin Industry K. K. was used as a binder. To a mixture of 3.92 grams of Liquid A of Daiel Latex GL-252 (containing 50 wt % of fluoroelastomer), 0.2 grams of Liquid B of Daiel Latex GL-252 (crosslinking agent solution), and 30.6 grams of synthetic graphite KS15 manufactured by Ronza Company as a negative electrode active material was added 58.66 grams of water to give an appropriate viscosity. They were dispersed in a ball mill as in Example 1 to form an electrode coating composition. The weight ratio of fluoroelastomer to graphite was 6:94. The electrode coating composition was coated to a copper foil, dried at 60° C. for 0 minutes, and heated at 150° C. for 30 minutes for crosslinking of the fluoroelastomer, obtaining an electrode of Comparative Example 1-2. In the electrode of Comparative Example 1-2, however, the electrode material had extremely weak adhesive force and readily shed from the copper foil. The cross-hatch adhesion test could not be performed due to the weak adhesive force of the electrode material.

<Example 1-2>

The binder raw material solution used was fluorocarbon resin Daiel DPA-351 manufactured by Daikin Industry K. K. as in Example 1-1. A polyethylene bottle having a volume of 250 cm$^3$ was charged with 6.58 grams of Daiel DPA-351 (of which 1.7 grams was the binder raw material), 45.13 grams of N-methylpyrrolidone as a diluent, 0.33 grams of a crosslinking agent (polyamine) solution, 15.43 grams of synthetic graphite KS15 manufactured by Ronza Company as a negative electrode active material, and 125 cm$^3$ of $ZrO_2$ beads of diameter 1 mm as a dispersing medium. The weight ratio of binder raw material to graphite was 10:90. Dispersion was continued for 10 hours to form an electrode coating composition. The following procedure was the same as in Example 1-1.

As a result, the discharge capacity at the second cycle was as large as 321 mAh per gram of graphite and the percent capacity deterioration was as low as 2.2%, indicating satisfactory cell performance. The result of the adhesion test was also satisfactory because no sections peeled off.

<Example 1-3>

The binder used was silane-crosslinked polyvinylidene fluoride. The polyvinylidene fluoride used was PVDF (brand name Kynar 741) manufactured by Montecatini. In 100 parts by weight of the PVDF were dispersed 10 parts by weight of vinyltris(β-methoxyethoxy)silane and 1 part by weight of 2,5-dimethyl-2,5-di(tert-butylperoxy)-3-hexyne. The dispersion was admitted into a twin-screw extruder at a barrel temperature of 210° C., thereby grafting the silane compound to the PVDF.

The silane-grafted PVDF, 1.71 grams, was dissolved in 50 cm$^3$ of N-methylpyrrolidone, and 15.43 grams of graphite KS15 manufactured by Ronza Company was added thereto. The following procedure was the same as in Example 1-1.

The coated titanium plate and copper foil were immersed in water having 10% by weight of dibutyltin dilaurate suspended therein and heated at 80° C. for 15 hours for crosslinking treatment. The crosslinked coatings were washed with acetone, dried, and evaluated.

As a result, the discharge capacity at the second cycle was as large as 330 mAh per gram of graphite and the percent capacity deterioration was as low as 2.0%, indicating satisfactory cell performance. The result of the adhesion test was also satisfactory because no sections peeled off.

<Comparative Example 1-3>

The binder used was PVDF (brand name Kynar 741) manufactured by Montecatini without modification. 1.71 grams of PVDF was dissolved in 50 cm$^3$ of N-methylpyrrolidone, and 15.43 grams of graphite KS15 manufactured by Ronza Company was added thereto. The following procedure was the same as in Example 1-1.

As a result, the discharge capacity at the second cycle was as large as 320 mAh per gram of graphite, but the percent capacity deterioration was high and reached 10%. In the adhesion test, all 100 coating sections peeled off.

<Example 1-4>

The binder used was fluoroelastomer G-751 manufactured by Daikin Industry K. K. This fluoroelastomer had a polyol crosslinking agent, 2,2-bis(4-hydroxyphenyl) hexafluoropropane (bisphenol-AF) previously incorporated in raw rubber. As in Example 1-1, a polyethylene bottle was charged with 48.94 grams of N-methylpyrrolidone, to which 1.33 grams of fluoroelastomer G-751 was added and dissolved therein. To the solution were added 0.08 grams of $Ca(OH)_2$ (CALDIC-2000 manufactured by Omi Chemical K. K.), 0.04 grams of MgO (Kyowamag MA-150 manufactured by Kyowa Chemical K. K.), and 22.66 grams of synthetic graphite KS15 manufactured by Ronza Company. The ingredients were dispersed in a ball mill to form an electrode coating liquid. After drying off N-methylpyrrolidone, the composition consisted of graphite: fluoroelastomer: $Ca(OH)_2$: MgO=94:5.5:0.3:0.2 in weight ratio. The electrode coating liquid was coated to a titanium plate and a copper foil and evaluated as in Example 1-1. As a result of the charge-discharge test, the discharge capacity at the second cycle was as large as 333 mAh per gram of graphite and the percent capacity deterioration was as low as 1.2%.

<Example 1-5>

Lithium carbonate and cobalt carbonate were mixed so as to give a lithium to cobalt molar ratio of 1:1 and fired in air at 900° C. for 10 hours, obtaining $LiCoO_2$.

The binder raw material solution used was fluorocarbon resin Daiel DPA-351 manufactured by Daikin Industry K. K. A polyethylene bottle having a volume of 250 cm$^3$ was charged with 4 grams of Daiel DPA-351 (of which 1 gram was the binder raw material), 47.0 grams of N-methylpyrrolidone as a diluent, 0.2 grams of a crosslinking agent (polyamine) solution, 14.83 grams of the above-prepared $LiCoO_2$ as a positive electrode active material, 0.83 grams of synthetic graphite KS15 manufactured by Ronza Company as a conductive aid, and 125 cm$^3$ of $ZrO_2$ beads of diameter 1 mm as a dispersing medium. The weight ratio of $LiCoO_2$ to graphite to binder was 89:5:6. Dispersion was continued for 10 hours to form an electrode coating composition. The electrode coating composition was coated to a titanium plate of 20 mm square in an amount of about 130 mg. The electrode coating composition was also coated to an aluminum foil of 15 μm thick, 45 mm wide and 150 mm long by means of an applicator. The coatings were dried in vacuum at 120° C. for 2 hours to accomplish solvent removal and crosslinking. A titanium wire was spot welded to the titanium plate to form an electrode.

Using the electrode as a working electrode and the same counter electrode, reference electrode, and electrolyte solution as in Example 1-1, a charge-discharge test was carried out at a constant current flow of 2 mA over the range of from 4.2 to 3.0 volts versus $Li/Li^+$. As a result, the discharge capacity at the second cycle was as large as 110 mAh per gram of $LiCoO_2$ and the percent capacity deterioration was as low as 2.0%, indicating satisfactory cell performance.

In an adhesion test as above, the result was satisfactory because no sections peeled off.

<Comparative Example 1-4>

The binder used was PVDF (brand name Kynar 741) manufactured by Montecatini without modification. 1.00 grams of PVDF was dissolved in 50 cm$^3$ of N-methylpyrrolidone, to which were added 14.83 grams of $LiCoO_2$ as a positive electrode active material, 0.83 grams of graphite KS15 manufactured by Ronza Company as a conductive aid, and 125 cm$^3$ of $ZrO_2$ beads of diameter 1 mm as a dispersing medium. The weight ratio of $LiCoO_2$ to graphite to binder was 89:5:6. The following procedure was the same as in Example 1-4.

As a result of the charge-discharge test, the discharge capacity at the second cycle was as small as 80 mAh per gram of $LiCoO_2$ and the percent capacity deterioration was as high as 10.0%, indicating failure to achieve satisfactory cell performance. The adhesion test showed a poor result since 100 sections peeled off.

<Example 1-6>

Figure 2:
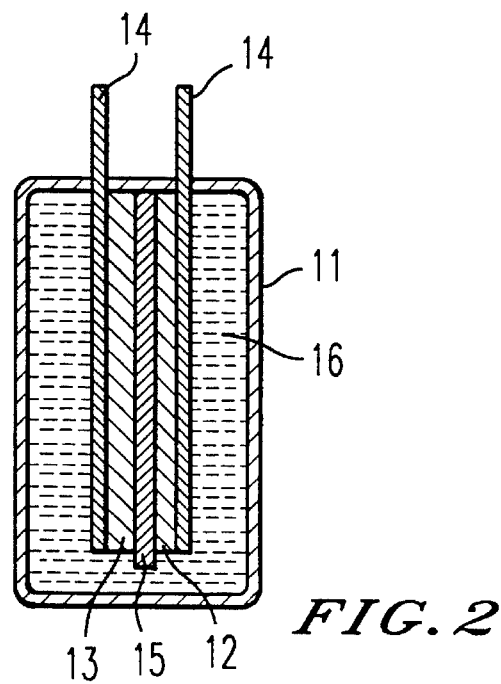
FIG. 2 is a cross-sectional view showing one exemplary structure of a lithium secondary cell.

A cell of the structure shown in FIG. 2 was fabricated. A negative electrode 12 was the electrode prepared in Example 1-1 and cut to a length of 50 mm. The negative electrode had a coating of 90 mm thick. A positive electrode 13 was the electrode prepared in Example 1-5 and cut to a length of 50 mm. The positive electrode had a coating of 70 µm thick. Titanium wires 14 were connected to the negative and positive electrodes to provide external terminals. The negative and positive electrodes 12 and 13 and a separator 15 of polyethylene were sealingly placed in a casing 11 together with an electrolyte solution 16 (which was the same as the electrolyte solution of Example 1) to construct the cell. The cell was charged at a constant current flow of 10 mA until 4.2 volts was reached, and then discharged at a constant current flow of 10 mA until 3.0 volts was reached. This charge-discharge cycle was repeated.

As a result, the discharge capacity was 50 mAh/g both at the second and tenth cycles, with no change of capacity observed.

<Comparative Example 1-5>

A cell was assembled as in Example 1-6 except that the negative electrode was the electrode prepared in Comparative Example 1-3 and the positive electrode was the electrode prepared in Comparative Example 1-4.

This cell was subjected to repetitive charge-discharge cycles as in Example 1-6, to find that the discharge capacity at the second cycle was as small as 45 mAh/g and the discharge capacity at the tenth cycle was 40 mAh/g, with the percent capacity deterioration reaching about 11%.

| Electrode coating composition | Parts by weight |
|---|---|
| Active material $LiCoO_2$ | 100 |
| Acetylene black (HS100), manufactured by Denki Kagaku K.K.) | 2 |
| Graphite (KS44, manufactured by Ronza Company) | 6 |
| Binder resin (see Table 1) | 8 |
| Radiation-curable compound (see Table 1) | 1 |
| N-methylpyrrolidone | 180 |

The ingredients were mixed and dispersed in a ball mill for 10 hours to form the electrode coating composition. The electrode coating composition was coated to either surface of an aluminum foil of 20 µm thick by a doctor blade technique and dried with hot air. Subsequent rolling treatment by a calender roll yielded an electrode layer of 70 µm thick on each surface. Using an area beam type electron beam accelerator manufactured by Nisshin High Voltage K. K., electron beams were irradiated under conditions: an accelerating voltage of 150 keV, an electrode current flow of 20 mA, and a radiation dose of 20 Mrad. in a nitrogen atmosphere for effecting curing treatment. The thus obtained sample was cut to a strip of 25 mm long and 20 mm wide, from which an upper end portion of the electrode layer was removed over a distance of 5 mm to leave the electrode layer of 20 mm square. A titanium wire was spot welded to the upper end portion of the strip where the electrode layer had been removed to form an electrode A, B, C or D (see Table 1).

TABLE 1

| | Electrode | Binder | Radiation curable compound | Discharge capacity (mAh/g) | | | | | |
|---|---|---|---|---|---|---|---|---|---|
| | | | | 1 | 5 | 10 | 15 | 20 | cycles |
| E 2-1 | A | HYLAR720 | triallyl cyanurate | 127 | 125 | 124 | 124 | 123 | |
| E 2-2 | B | HYLAR2800 | Aronix M309 | 119 | 119 | 117 | 115 | 116 | |
| E 2-3 | C | HYLAR2800 | triallyl cyanurate | 131 | 130 | 130 | 130 | 129 | |
| E 2-4 | D | HYLAR2800 | triallyl trimesate | 120 | 119 | 119 | 118 | 118 | |
| E 2-5 | E | HYLAR2800 | | 122 | 118 | 111 | 106 | 100 | |
| CE 2-1 | G | HYLAR720 | | 115 | 113 | 90 | 84 | 76 | |
| CE 2-2 | H | HYLAR2800 | | 112 | 107 | 21 | 0 | 0 | |

HYLAR 720 (polyvinylidene fluoride): manufactured by Montecatini
HYLAR 2800 (vinylidene fluoride-hexafluoropropylene copolymer): manufactured by Montecatini
Triallyl cyanurate: Degussa Inc.
Aronix M309 (trimethylolpropane triacrylate): Toa Synthetic Chemical Industry K.K.
Triallyl trimesate: Tokyo Chemicals Industry K.K.

Example 2

Electrode materials for positive and negative electrodes were prepared as follows and evaluated for charge-discharge performance.

<Examples 2-1 to 2-4>

A fully mixed and agitated mixture of 200 grams of cobalt carbonate and 100 grams of lithium carbonate was placed in a ceramic crucible and heated at 700° C. for 5 hours in an air atmosphere. Then the mixture was comminuted in a mortar to form a positive electrode active material. On X-ray diffractometry, the resulting positive electrode active material was identified to be $LiCoO_2$.

Using the above-prepared active material, an electrode coating composition was prepared. Its formulation is shown below.

Using these electrodes as a working electrode, charge-discharge performance measuring cells of Examples 2-1 to 2-4 were fabricated as follows and subjected to a charge-discharge test. The results are shown in Table 1.

The counter electrode and reference electrode were lithium plates connected to titanium wires and the electrolyte solution used was a solvent mixture of ethylene carbonate and diethyl carbonate in a volume ratio of 1:1 in which 1M of lithium perchlorate was dissolved. Charge-discharge operation was effected at a constant current flow of 4 mA over the range of from 3 to 4.2 volts versus $Li/Li^+$.

The charge-discharge performance measuring cells were of the structure shown in FIG. 1 and used in Example 1-1, etc.

<Example 2-5>

Positive electrode active material LiCoO$_2$ was synthesized as in Examples 2-1 to 2-3. Using the active material, an electrode coating composition was prepared. Its formulation is shown below.

| Electrode coating composition | Parts by weight |
| --- | --- |
| Active material LiCoO$_2$ | 100 |
| Acetylene black (HS100, manufactured by Denki Kagaku K.K.) | 2 |
| Graphite (KS44, manufactured by Ronza Company) | 6 |
| Binder resin (see Table 1) | 8 |
| N-methylpyrrolidone | 180 |

Electrode E was prepared from the above-formulated composition by the same procedure as in Examples 2-1 to 2-4 except that the radiation curing conditions were changed to an accelerating voltage of 150 keV, an electrode current flow of 20 mA, and a radiation dose of 40 Mrad. As in the foregoing Example, the cell of Example 2-5 was fabricated and an electrode test done. The results are shown in Table 1.

<Comparative Examples 2-1 and 2-2>

Electrodes F and G were prepared by the same procedure as Example 2-5 except that the radiation curing treatment was omitted. As in the foregoing Example, the cells of Comparative Examples 2-1 and 2-2 were fabricated and an electrode test done. The results are shown in Table 1.

<Examples 2-6 to 2-9>

Using graphite as an active material, an electrode coating composition was prepared. Its formulation is shown below.

| Electrode coating composition | Parts by weight |
| --- | --- |
| Active material graphite (KS44, manufactured by Ronza Company) | 100 |
| Binder resin (see Table 2) | 8 |
| Radiation curable compound (see Table 2) | 1 |
| N-methylpyrrolidone | 180 |

The ingredients were mixed and dispersed in a ball mill for 10 hours to form the electrode coating composition. The electrode coating composition was coated to either surface of a copper foil of 12 μm thick by a doctor blade technique and dried with hot air to form an electrode layer of 100 μm thick on each surface. Using an area beam type electron beam accelerator manufactured by Nisshin High Voltage K. K., electron beams were irradiated under conditions: an accelerating voltage of 150 keV, an electrode current flow of 20 mA, and a radiation dose of 20 Mrad. in a nitrogen atmosphere for effecting curing treatment. The thus obtained sample was cut to a strip of 25 mm long and 20 mm wide, from which an upper end portion of the electrode layer was removed over a distance of 5 mm to leave the electrode layer of 20 mm square. A titanium wire was spot welded to the upper end portion of the strip where the electrode layer had been removed to form an electrode H, I, J or K (see Table 2).

TABLE 2

| | | | | Discharge capacity (mAh/g) | | | | | |
| --- | --- | --- | --- | --- | --- | --- | --- | --- | --- |
| | Electrode | Binder | Radiation curable compound | 1 | 5 | 10 | 15 | 20 | cycles |
| E 2-6 | H | HYLAR720 | triallyl cyanurate | 325 | 319 | 322 | 320 | 318 | |
| E 2-7 | I | HYLAR2800 | Aronix M309 | 332 | 329 | 325 | 327 | 325 | |
| E 2-8 | J | HYLAR2800 | triallyl cyanurate | 351 | 345 | 349 | 343 | 341 | |
| E 2-9 | K | HYLAR2800 | triallyl trimesate | 319 | 319 | 317 | 316 | 315 | |
| E 2-10 | L | HYLAR720 | | 309 | 298 | 295 | 294 | 276 | |
| E 2-11 | M | HYLAR2800 | | 281 | 286 | 281 | 265 | 251 | |
| CE 2-3 | N | HYLAR720 | | 304 | 261 | 232 | 191 | 165 | |
| CE 2-4 | O | HYLAR2800 | | 234 | 209 | 177 | 94 | 31 | |

HYLAR 720 (polyvinylidene fluoride): manufactured by Montecatini
HYLAR 2800 (vinylidene fluoride-hexafluoropropylene copolymer): manufactured by Montecatini It is seen from Table 1 that the cells of Examples 2-1 to 2-5 using electrodes A, B, C, D, and E within the scope of the invention experience a less lowering of discharge capacity upon repetition of charge-discharge operation. When the discharge capacity at the 20th cycle is compared in Table 1, for example, it is evident that the cell of Example 2-5 using electrode E which was free from a radiation curable compound, but exposed to electron beams had improved discharge capacity over the cells of Comparative Examples 2-1 and 2-2 using electrodes F and G which were not exposed to electron beams, and the cells of Examples 2-1 to 2-4 using electrodes A, B, C, and D which contained a radiation curable compound and were exposed to electron beams had significantly improved discharge capacity despite a low dose of electron radiation. It is then evident that the secondary cell of the invention is improved in charge-discharge cycle life.

Using these electrodes as a working electrode, cells of Examples 2-6 to 2-9 were fabricated as follows and subjected to a charge-discharge test. The cell structure was the same as above.

The counter electrode and reference electrode were lithium plates connected to titanium wires and the electrolyte solution used was a solvent mixture of ethylene carbonate and diethyl carbonate in a volume ratio of 1:1 in which 1M of lithium perchlorate was dissolved. Charge-discharge operation was effected at a constant current flow of 4 mA over the range of from 0 to 1 volt versus Li/Li$^+$. The results are shown in Table 2.

<Examples 2-10 and 2-11>

Using graphite as an active material, an electrode coating composition was prepared as in Examples 2-6 to 2-9. Its formulation is shown below.

| Electrode coating composition | Parts by weight |
|---|---|
| Active material graphite (KS44, manufactured by Ronza Company) | 100 |
| Binder resin (see Table 2) | 8 |
| N-methylpyrrolidone | 180 |

Electrodes L and M were prepared from the above-formulated composition by the same procedure as in Examples 2-6 to 2-9 except that the radiation curing conditions were changed to an accelerating voltage of 150 keV, an electrode current flow of 20 mA, and a radiation dose of 40 Mrad., and the cells of Examples 2-10 and 2-11 were fabricated. An electrode test was done as described above. The results are shown in Table 2.

<Comparative Examples 2-3 and 2-4>

Electrodes N and O were prepared from the same composition by the same procedure as in Examples 2-10 and 2-11 except that the radiation curing treatment was omitted, the cells of Comparative Examples 2-3 and 2-4 were fabricated, and an electrode test was done. The results are shown in Table 2.

It is seen from Table 2 that the cells of Examples 2-6, 2-7, 2-8, and 2-9 using electrodes H, I, J, and K within the scope of the invention are high in initial discharge capacity and experience a less lowering of discharge capacity upon repetition of charge-discharge operation. For example, when the discharge capacity at the first cycle is compared in Table 2, it is evident that the cells of Examples 2-6, 2-7, 2-8, and 2-9 using electrodes H, I, J, and K had improved discharge capacity over the cells of Comparative Examples 2-3 and 2-4 using electrodes N and O. When the discharge capacity at the 20th cycle is compared, it is evident that the cells of Examples 2-6 to 2-11 using electrodes H, I, J, K, L, and M had significantly improved discharge capacity over the cells of Comparative Examples 2-3 and 2-4 using electrodes N and O. It is then evident that the secondary cell of the invention is improved in both charge-discharge capacity and cycle life.

We claim:

1. A lithium secondary cell comprising:
   carbon as a negative electrode material, and
   a layer lattice compound which allows for intercalation or doping of lithium ions, or carbon, as a positive electrode material,
   wherein said negative electrode material and/or positive electrode material is bonded to a surface of a current collector by a binder containing a crosslinked polymer, wherein said crosslinked polymer contains fluorine.

2. The lithium secondary cell of claim 1 wherein said crosslinked polymer is obtained by dissolving a crosslinkable polymer in an organic solvent, dispersing the electrode material in powder form in the solution to form a composition, and applying the composition to the current collector, followed by drying and crosslinking.

3. The lithium secondary cell of claim 1 or 2 wherein said crosslinked polymer is crosslinked with a polyamine, polyol, peroxide or triazine dithiol.

4. The lithium secondary cell of claim 1 or 2 wherein said crosslinked polymer is a silane-grafted polyvinylidene fluoride crosslinked with water.

5. The lithium secondary cell of any one of claim 1 or 2 wherein said carbon is graphite having a mean particle size of 1 to 30 μm.

6. The lithium secondary cell of any one of claim 1 or 2 wherein a solvent mixture containing ethylene carbonate as a major component is used as a solvent for an electrolyte.

7. A lithium secondary cell comprising:
   a non-aqueous electrolyte including a lithium-containing electrolyte, and
   an electrode layer forming a negative electrode and/or positive electrode,
   wherein said electrode layer is formed by coating to a current collector a composition comprising an active material and a polymer binder containing a fluorinated polymer which is curable upon exposure to radiation, followed by radiation curing treating.

8. The lithium secondary cell of claim 7 wherein said polymer binder contains at least 50% by weight of the fluorinated polymer based on the total weight of polymers in the binder.

9. The lithium secondary cell of claim 7 or 8 wherein said fluorinated polymer has a radiation-curable group introduced on an end or on a side chain of said polymer molecule for promoting its radiation curability.

10. The lithium secondary cell of any one of claim 7 or 8 wherein said composition from which said electrode layer is formed contains a radiation-curable compound having at least two groups each having a radiation-curable unsaturated double bond.

11. The lithium secondary cell of claim 10 characterized in that said group having an unsaturated double bond is an allyl group of the following formula (1):

(1)

wherein R is hydrogen or fluorine.

12. The lithium secondary cell of claim 10 wherein said group having an unsaturated double bond is an acryloyl group of the following formula (2):

(2)

wherein R is hydrogen, fluorine, an alkyl group or a fluoroalkyl group.

13. The lithium secondary cell of claim 9 wherein said radiation-curable compound is present in an amount of 0.1 to 50 parts by weight per 100 parts by weight of the total weight of polymers.

* * * * *